US005604967A

United States Patent [19]
McMahon

[11] Patent Number: 5,604,967
[45] Date of Patent: Feb. 25, 1997

[54] DOWEL EXTRACTION DEVICE

[76] Inventor: Richard P. McMahon, 181 Sulphide St., Broken Hill, New South Wales 2880, Australia

[21] Appl. No.: 446,950

[22] Filed: May 15, 1995

[51] Int. Cl.$^{6}$ ..................... B23P 19/04

[52] U.S. Cl. ..................... 29/263

[58] Field of Search ..................... 29/256, 263, 258–260, 29/264–265, 254–255

[56] References Cited

U.S. PATENT DOCUMENTS

| | | | |
|---|---|---|---|
| 3,972,103 | 8/1976 | Kenyon | 29/263 |
| 4,059,883 | 11/1977 | Osborne | 29/259 |
| 4,420,864 | 12/1983 | Hoyt | 29/263 |
| 4,939,831 | 7/1990 | Doninger | 29/263 |

*Primary Examiner*—Robert C. Watson

[57] ABSTRACT

A dowel extraction device comprising: an inner cylinder formed in a generally cylindrical configuration with an upper surface and a lower surface, the lower surface including a bore extending therein, the bore including adjustable coupling devices to permit gripping of dowels having different diameters; a central shaft formed an elongated cylindrical configuration with a plurality of external screw threads, the shaft being fixedly attached to the upper surface of the inner cylinder, a nut having a threaded aperture adapted to be threadedly coupled to the central shaft; and an outer cylinder formed in a hollow generally cylindrical configuration with a closed upper end and an open lower end, the upper end including an aperture, the outer cylinder being positioned over the inner cylinder with the central shaft extending through the aperture, the nut being coupled to the shaft above the upper end of the outer cylinder, the apparatus adapted to grip and vertically remove a dowel by rotating the large nut thereby causing upward movement of the inner cylinder.

4 Claims, 3 Drawing Sheets

DOWEL EXTRACTION DEVICE

BACKGROUND OF THE INVENTION

1. Field of the Invention

The present invention relates to a dowel extraction device and more particularly pertains to vertically extracting dowels of varying diameters from engines and other machinery.

2. Description of the Prior Art

The use of extraction tools is known in the prior art. More specifically, extraction tools heretofore devised and utilized for the purpose of extracting various components from mechanical devices are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 3,750,500 to Peterson a dowel pin extractor tool.

U.S. Pat. No. 5,075,948 to Maier discloses a minimum clearance dowel pin extraction tool.

U.S. Pat. No. 3,740,814 to Marchall discloses a stud extractor.

U.S. Pat. No. 4,741,228 to O'Flaherty discloses a stud extractor.

U.S. Pat. No. 4,831,902 to McClure discloses a broken bolt extractor.

Lastly, U.S. Pat. No. 4,507,837 to Hinkle discloses an extractor tool.

In this respect, the dowel extraction device according to the present invention substantially departs from the conventional concepts and designs of the prior art, and in doing so provides an apparatus primarily developed for the purpose of vertically extracting dowels of varying diameters from engines and other machinery.

Therefore, it can be appreciated that there exists a continuing need for a new and improved dowel extraction device which can be used for vertically extracting dowels of varying diameters from engines and other machinery. In this regard, the present invention substantially fulfills this need.

SUMMARY OF THE INVENTION

In view of the foregoing disadvantages inherent in the known types of extraction tools now present in the prior art, the present invention provides an improved dowel extraction device. As such, the general purpose of the present invention, which will be described subsequently in greater detail, is to provide a new and improved dowel extraction device and method which has all the advantages of the prior art and none of the disadvantages.

To attain this, the present invention essentially comprises a new and improved dowel extraction device comprising, in combination: an inner cylinder formed in an essentially solid generally cylindrical configuration, the inner cylinder having an upper surface, a lower surface and a cylindrical side wall therebetween, the lower surface including a large centrally positioned bore extending axially therein, the cylindrical side wall including three equidistantly spaced threaded apertures extending into the central bore, the apertures being positioned slightly above the lower surface; three allen head bolts, each bolt being threaded and including an inboard end and an outboard end, the inboard end of each bolt including a point, the outboard end of each bolt including an allen head socket, the bolts being threadedly coupled within the threaded apertures of the inner cylinder, the allen head sockets adapted to receive and be rotated by an allen wrench, the bolts being inwardly or outwardly adjustable to permit gripping of dowels having different diameters; a central shaft formed an elongated generally cylindrical configuration with a plurality of external screw threads, the threaded shaft having an upper extent and a lower extent, the lower extent being fixedly attached to the approximate center point of the upper surface of the inner cylinder, a washer formed in a planar generally circular configuration, the washer including a large centrally positioned aperture and adapted to be positioned around the shaft, a nut formed in a planar generally hexagonal configuration, the nut having a threaded aperture and adapted to be threadedly coupled to the central shaft; and an outer cylinder formed in a hollow generally cylindrical configuration with an essentially closed upper end and an open lower end, the open lower end including three equidistantly spaced upwardly extending slots, the upper end including a large circular aperture extending therethrough, the outer cylinder adapted to be positioned over the inner cylinder with the upper extent of the central shaft extending through the aperture of the upper end, the washer and nut being coupled around the upper extent of the shaft, the slots of the outer cylinder adapted to be positioned around the allen head bolts, the apparatus adapted to grip and vertically remove a dowel by rotating the large nut thereby causing upward movement of the inner cylinder.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved dowel extraction device which has all of the advantages of the prior art extraction tools and none of the disadvantages.

It is another object of the present invention to provide a new and improved dowel extraction device which may be easily and efficiently manufactured and marketed.

It is further object of the present invention to provide a new and improved dowel extraction device which is of durable and reliable constructions.

An even further object of the present invention is to provide a new and improved dowel extraction device which is susceptible of a low cost of manufacture with regard to both materials and labor, and which accordingly is then susceptible of low prices of sale to the consuming public, thereby making such dowel extraction device economically available to the buying public.

Still yet another object of the present invention is to provide a new and improved dowel extraction device which provides in the apparatuses and methods of the prior art some of the advantages thereof, while simultaneously overcoming some of the disadvantages normally associated therewith.

Still another object of the present invention is to vertically extract dowels of varying diameters from engines and other machinery.

Lastly, it is an object of the present invention to provide a new and improved dowel extraction device comprising: an inner cylinder formed in a generally cylindrical configuration with an upper surface and a lower surface, the lower surface including a bore extending therein, the bore including adjustable coupling devices to permit gripping of dowels having different diameters; a central shaft formed an elongated cylindrical configuration with a plurality of external screw threads, the shaft being fixedly attached to the upper surface of the inner cylinder, a nut having a threaded aperture adapted to be threadedly coupled to the central shaft; and an outer cylinder formed in a hollow generally cylindrical configuration with a closed upper end and an open lower end, the upper end including an aperture, the outer cylinder being positioned over the inner cylinder with the central shaft extending through the aperture, the nut being coupled to the shaft above the upper end of the outer cylinder, the apparatus adapted to grip and vertically remove a dowel by rotating the large nut thereby causing upward movement of the inner cylinder.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
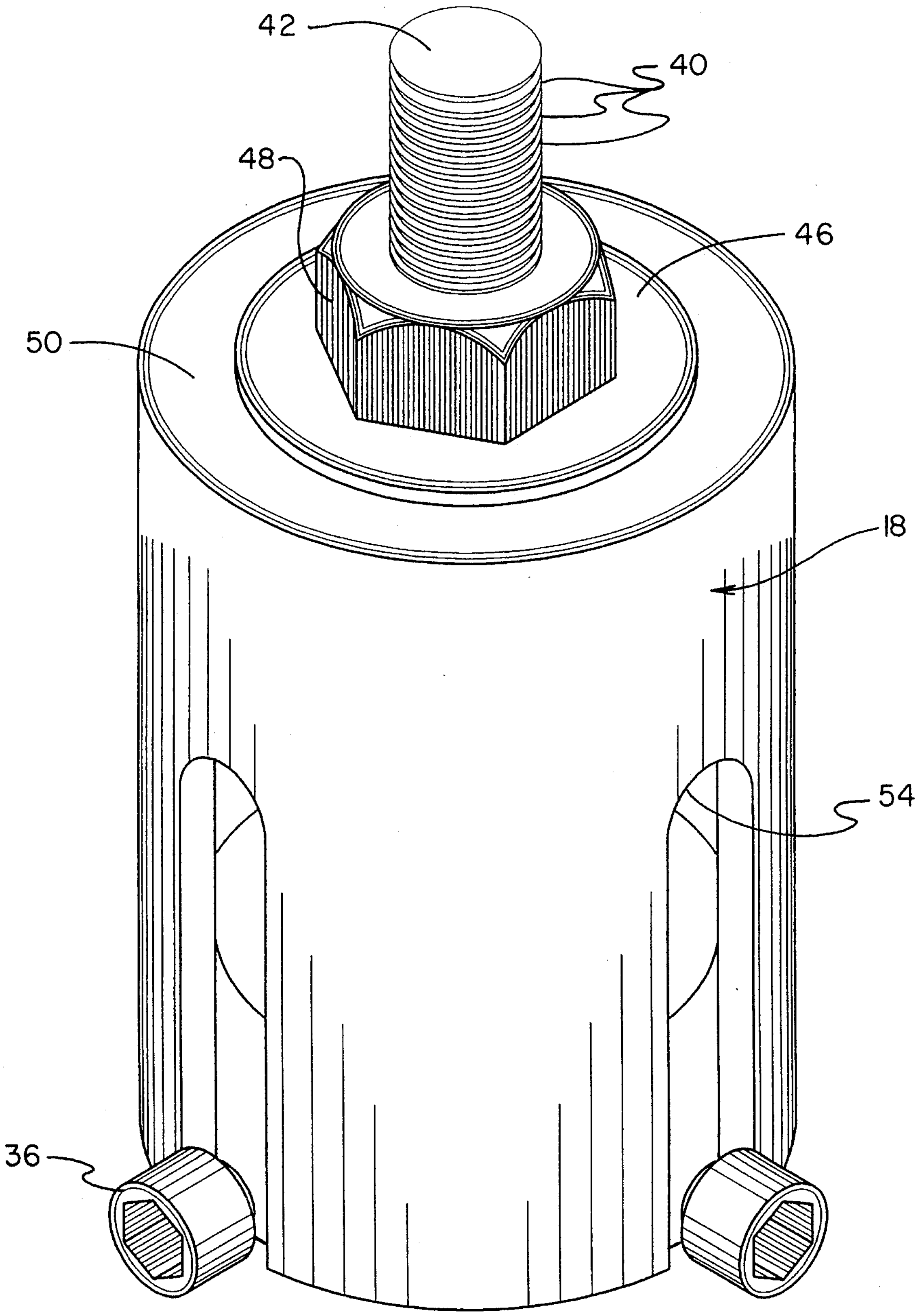
FIG. 1 is a perspective view of the preferred embodiment of the dowel extraction device constructed in accordance with the principles of the present invention.

With reference now to the drawings, and in particular to FIG. 1 thereof, the preferred embodiment of the new and improved dowel extraction device embodying the principles and concepts of the present invention and generally designated by the reference numeral 10 will be described.

The present invention, the dowel extraction device 10 is comprised of a plurality of components. Such components in their broadest context include an inner cylinder 12, three allen head bolts 14, a central shaft 16 and an outer cylinder 18. Such components are individually configured and correlated with respect to each other so as to attain the desired objective.

Figure 4:
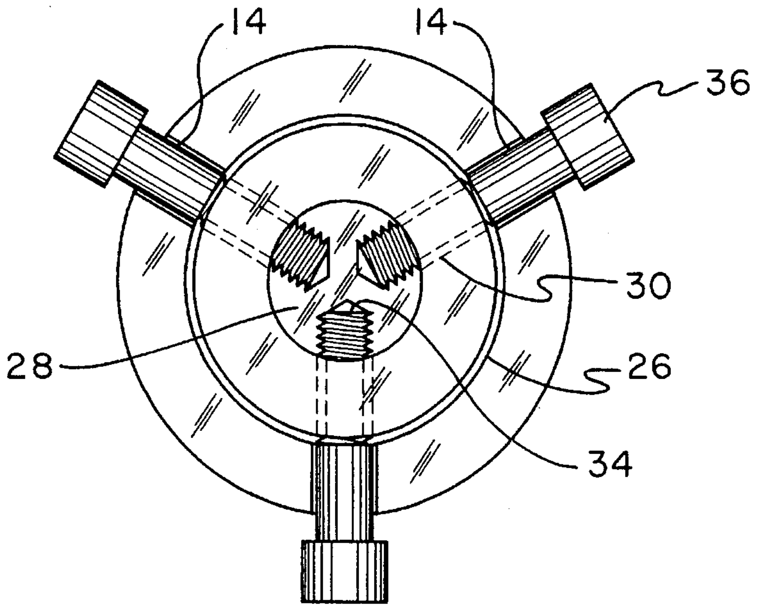
FIG. 4 is a top cross sectional view of the apparatus illustrating the positioning of the allen head bolts.
Figure 5:
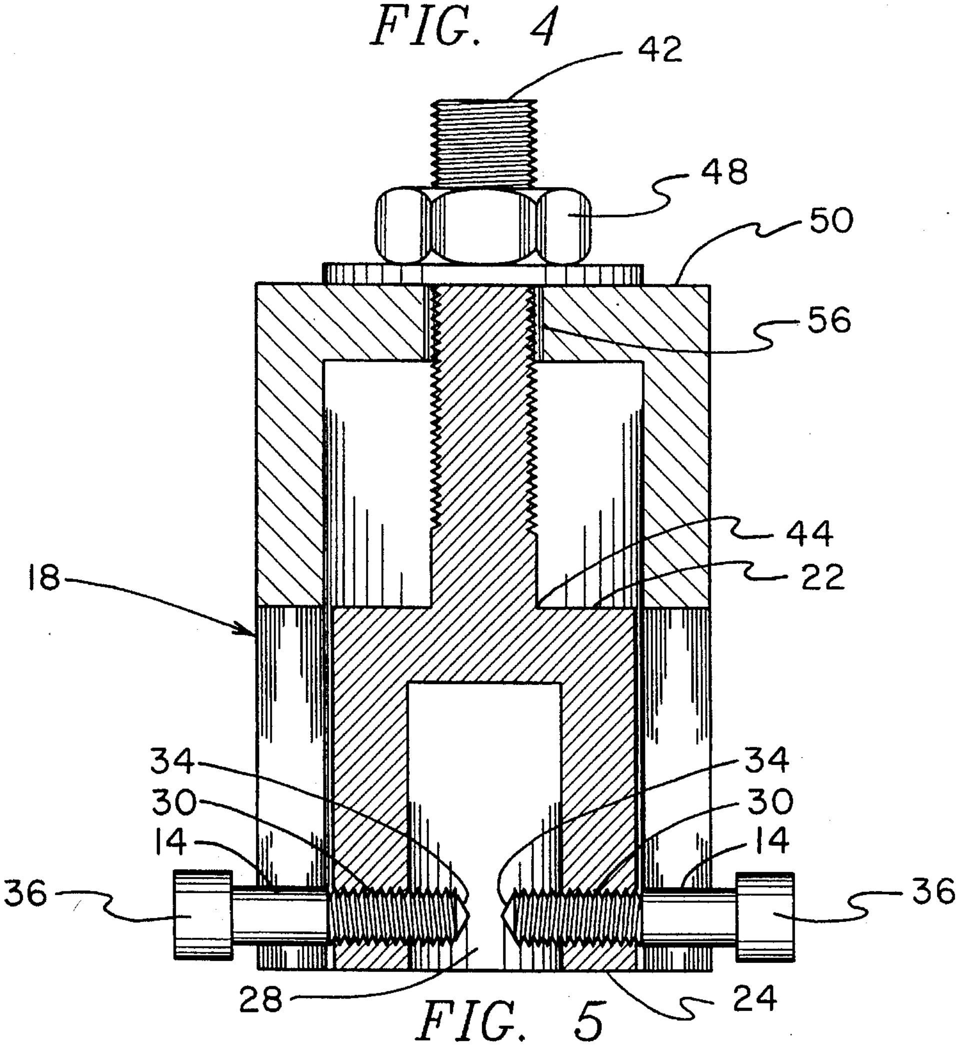
FIG. 5 is a cross sectional view of the apparatus taken along line 5—5 of FIG. 2.

More specifically, the inner cylinder 12 is formed in an essentially solid generally cylindrical configuration. In the preferred embodiment of the apparatus all of the components are fabricated of metal, preferably steel. The inner cylinder has an upper surface 22, a lower surface 24 and a cylindrical side wall 26 therebetween. The lower surface includes a large centrally positioned bore 28 which extends axially within it. In the preferred embodiment the bore is about one inch deep and has a diameter between ½ inch and ⅝ inches. In alternative embodiments the bore is larger or smaller based upon the needs of the user. The size and configuration of the bore permits the receipt of a plurality of differently sized dowels. The cylindrical side wall includes three equidistantly spaced threaded apertures 30 which extend into the central bore. The bores are spaced apart one hundred and twenty degrees from each other. Alternative embodiments of the apparatus include between two and six bores. The apertures are positioned slightly above the lower surface. Note FIGS. 4 and 5.

Three allen head bolts 14 are included with the apparatus. The bolts are fabricated of high tensile steel in the preferred embodiment. In alternative embodiments between six and eight bolts are included. Each bolt is threaded and includes an inboard end 34 and an outboard end. The inboard end 34 of each bolt includes a point. In alternative embodiments of the apparatus the bolts have a flat inboard end. The outboard end of each bolt includes an allen head socket 36. The bolts are threadedly coupled within the threaded apertures of the inner cylinder. The allen head sockets are adapted to receive and be rotated by an allen wrench. To accomplish this the user simply places the large allen wrench into the socket and turns it in a clockwise direction. Note FIGS. 4 and 5.

Figure 3:
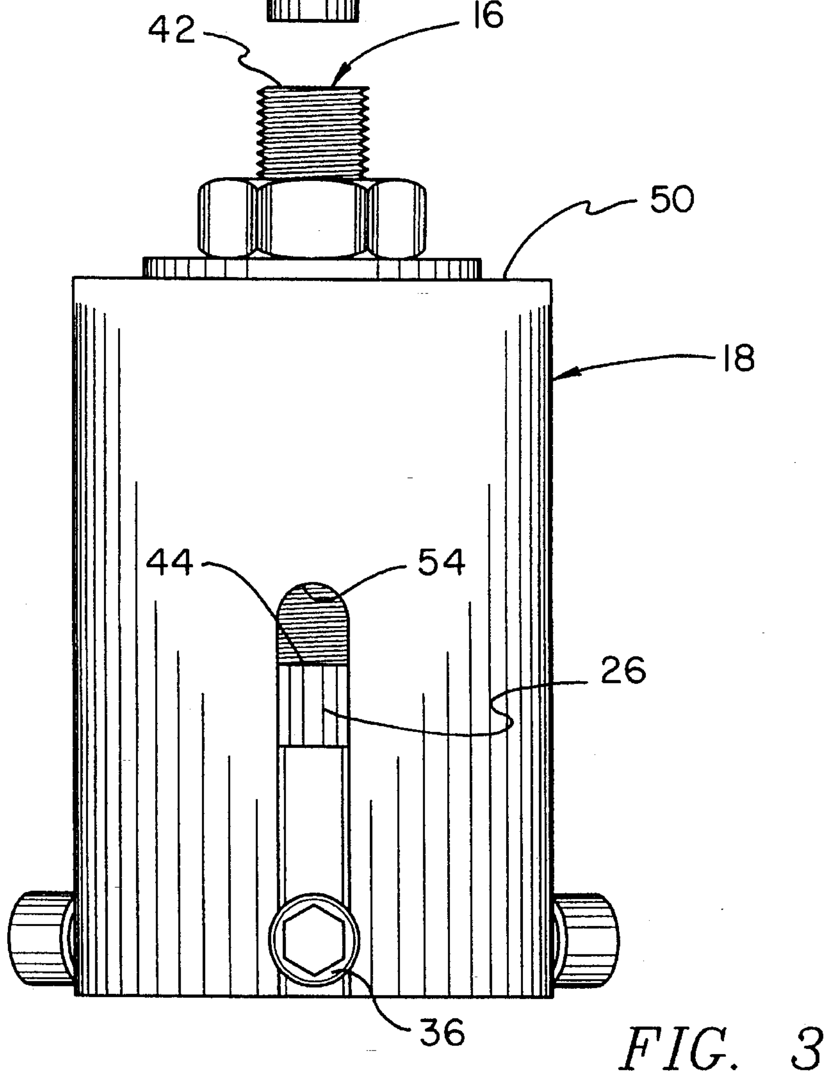
FIG. 3 is an elevational view of the apparatus shown in FIG. 1.

The bolts are inwardly or outwardly adjustable to permit gripping of dowels having different diameters. The equidistant positioning of the bolts enables the user to apply even pressure around a dowel to be extracted. This ensures minimal distortion of fragile or delicate dowels, particularly those fabricated of plastic, die-casting and ceramic materials. The points on the inboard ends of the bolts enhance their ability to grip a dowel. The dowels may be reused by simply repairing the small indentations left by the bolts. Note FIGS. 3 and 4.

Figure 2:
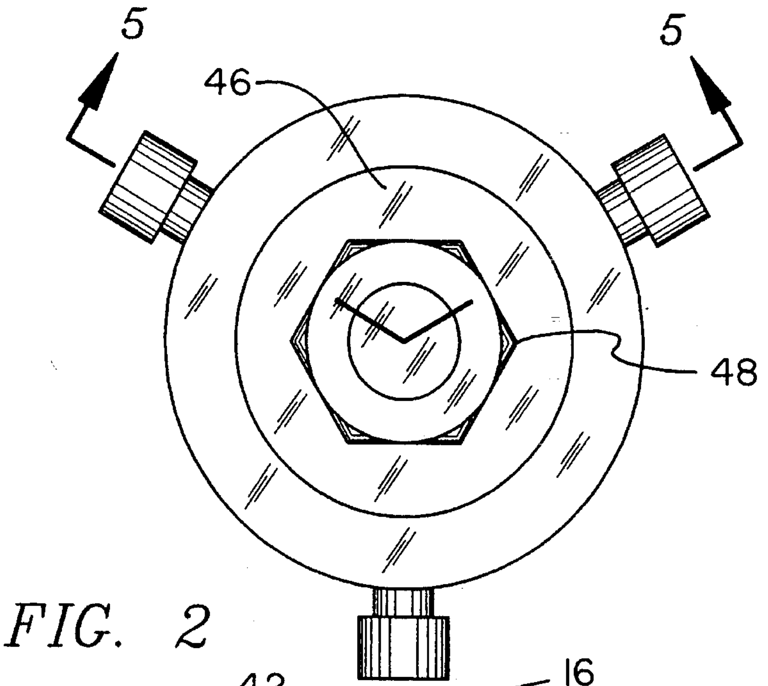
FIG. 2 is a top plan view of the apparatus illustrating the large nut and washer components.

A central shaft 16 is formed in an elongated generally cylindrical configuration with a plurality of external screw threads 40. The threaded shaft has an upper extent 42 and a lower extent 44. The lower extent is fixedly attached to the approximate center point of the upper surface of the inner cylinder. The shaft and inner cylinder may be manufactured as one contiguous piece. A washer 46 is fabricated of elastomeric materials and formed in a planar generally circular configuration. The washer includes a large centrally positioned aperture and is adapted to be positioned around the shaft. A nut 48 is formed in a planar generally hexagonal configuration. The nut has a threaded aperture and is adapted to be threadedly coupled to the central shaft. Note FIGS. 1–3.

An outer cylinder 18 is formed in a hollow generally cylindrical configuration with an essentially closed upper end 50 and an open lower end 52. The open lower end includes three equidistantly spaced, upwardly extending slots 54. In alternative embodiments of the apparatus the slots are positioned higher upon the outer cylinder rather than being contiguous with the open lower end. The slots are positioned one hundred and twenty degrees from each other to conform to the locations of the bolts. The upper end includes a large circular aperture 56. The outer cylinder is adapted to be positioned over the inner cylinder. The upper extent of the central shaft extends vertically through the aperture in the upper end of the outer cylinder. The aperture is sized to tightly retain the shaft in the operative orientation. Note FIGS. 1 and 4.

The washer 46 and nut 48 are coupled around the upper extent of the shaft. In this fully assembled configuration the inner cylinder is locked within the hollow interior of the outer cylinder. The slots of the outer cylinder are adapted to be positioned around the allen head bolts. The allen head sockets are positioned outside of the outer cylinder. The apparatus permits a user to grip and vertically remove a dowel by rotating the large nut with a cooperatively coupled wrench. When the nut is turned in a clockwise direction, the threaded shaft and inner cylinder are forced vertically upward due to the angle of the threads. The positioning of the slots around the bolts serves to counteract the rotational forces caused by turning the nut. This configuration helps to force the inner cylinder upward or downward, depending upon the direction that the nut is being turned. The apparatus is ideal when working in confined spaces. The configuration of the apparatus also prevents backlashes caused by dowels coming loose from their previously coupled machinery. Note FIG. 5.

When the nut is turned in a counter clockwise direction the threaded shaft and inner cylinder are forced vertically downward due to the angle of the threads. This feature is particularly useful when lowering dowels into machinery or placing components within engines. Note FIG. 3.

The dowel extraction device is used to remove dowels from machinery. The dowels are generally used as locating pins on machined surfaces. In order to recondition these machined surfaces, sometimes the dowels must be removed. Previous methods of removal entail loosening them with a hammer or drilling them out. The present invention utilizes three bolts, each having a point at one end, which are tightened onto a dowel to be removed. The large nut on top is tightened, thereby causing downward forces upon the outer cylinder. This motion draws the inner cylinder upwards thus removing the dowel.

The following list represents an inexhaustive summary of some of the devices which may be manipulated using the dowel extraction device: Engine heads to cylinder blocks, clutch plates to flywheels, flywheels to crankshafts, motorbike crankcases, pump and compressor housings, injection molds that use dowels, gearboxes and drive mechanisms, and any other machinery that uses dowels for location and/or alignment.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved dowel extraction device comprising, in combination:

an inner cylinder formed in an essentially solid generally cylindrical configuration, the inner cylinder having an upper surface, a lower surface and a cylindrical side wall therebetween, the lower surface including a large centrally positioned bore extending axially therein, the cylindrical side wall including three equidistantly spaced threaded apertures extending into the central bore, the apertures being positioned slightly above the lower surface;

three allen head bolts, each bolt being threaded and including an inboard end and an outboard end, the inboard end of each bolt including a point, the outboard end of each bolt including an allen head socket, the bolts being threadedly coupled within the threaded apertures of the inner cylinder, the allen head sockets adapted to receive and be rotated by an allen wrench, the bolts being inwardly or outwardly adjustable to permit gripping of dowels having different diameters;

a central shaft formed an elongated generally cylindrical configuration with a plurality of external screw threads, the threaded shaft having an upper extent and a lower extent, the lower extent being fixedly attached to the approximate center point of the upper surface of the inner cylinder, a washer formed in a planar generally circular configuration, the washer including a large centrally positioned aperture and adapted to be positioned around the shaft, a nut formed in a planar generally hexagonal configuration, the nut having a threaded aperture and adapted to be threadedly coupled to the central shaft; and an outer cylinder formed in a hollow generally cylindrical configuration with an essentially closed upper end and an open lower end, the open lower end including three equidistantly spaced upwardly extending slots, the upper end including a large circular aperture extending therethrough, the outer cylinder adapted to be positioned over the inner cylinder with the upper extent of the central shaft extending through the aperture of the upper end, the washer and nut being coupled around the upper extent of the shaft, the slots of the outer cylinder adapted to be positioned around the allen head bolts, the apparatus adapted to grip and vertically remove a dowel by rotating the large nut thereby causing upward movement of the inner cylinder.

2. A dowel extraction device comprising:

an inner cylinder formed in a solid, generally cylindrical configuration with an upper surface and a lower surface, the lower surface including a bore extending therein, the bore including adjustable coupling devices to permit gripping of dowels having different diameters;

a central shaft formed in an elongated cylindrical configuration with a plurality of external screw threads, the shaft being fixedly attached to the upper surface of the inner cylinder, a nut having a threaded aperture adapted to be threadedly coupled to the central shafts, the nut being formed in a planar generally hexagonal configuration; and an outer cylinder formed in a hollow generally cylindrical configuration with a closed upper end and an open lower end, the upper end including circular aperture, the outer cylinder being positioned over the inner cylinder with the central shaft extending through the aperture, the nut being coupled to the shaft above the upper end of the outer cylinder, the apparatus adapted to grip and vertically remove a dowel by rotating the large nut thereby causing upward movement of the inner cylinder; and a washer formed in a planar generally circular configuration, the washer including a large centrally positioned aperture and adapted to be positioned around the shaft between the nut and upper end of the outer cylinder.

3. A dowel extraction device comprising:

an inner cylinder formed in a generally cylindrical configuration with an upper surface and a lower surface, the lower surface including a bore extending therein, the bore including adjustable coupling devices to permit gripping of dowels having different diameters;

a central shaft forming an elongated cylindrical configuration with a plurality of external screw threads, the shaft being fixedly attached to the upper surface of the inner cylinder, a nut having a threaded aperture adapted to be threadedly coupled to the central shaft: and an outer cylinder formed in a hollow generally cylindrical configuration with a closed upper end and an open lower end, the upper end including an aperture, the outer cylinder being positioned over the inner cylinder with the central shaft extending through the aperture, the nut being coupled to the shaft above the upper end of the outer cylinder, the apparatus adapted to grip and vertically remove a dowel by rotating the large nut thereby causing upward movement of the inner cylinder, the lower end of the outer cylinder including a plurality of upwardly extending slots, the inner cylinder including a plurality of radially positioned threaded apertures; and a plurality of bolts, each bolt being threaded and coupled through the apertures of the inner cylinder, the bolts being inwardly or outwardly adjustable to permit gripping of dowels having different diameters.

4. The apparatus as set forth in claim 3 wherein each of the bolts includes an inboard end with a point and an outboard end with an allen head socket, the allen head sockets adapted to receive and be rotated by an allen wrench.

* * * * *